US011414536B2

(12) United States Patent
Hayasaka

(10) Patent No.: US 11,414,536 B2
(45) Date of Patent: Aug. 16, 2022

(54) LATEX COMPOSITION

(71) Applicant: ZEON CORPORATION, Tokyo (JP)

(72) Inventor: Kentaro Hayasaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 132 days.

(21) Appl. No.: 16/957,402

(22) PCT Filed: Jan. 10, 2019

(86) PCT No.: PCT/JP2019/000541
§ 371 (c)(1),
(2) Date: Jun. 24, 2020

(87) PCT Pub. No.: WO2019/139082
PCT Pub. Date: Jul. 18, 2019

(65) Prior Publication Data
US 2020/0332091 A1 Oct. 22, 2020

(30) Foreign Application Priority Data

Jan. 12, 2018 (JP) .............................. JP2018-003073

(51) Int. Cl.
C08L 9/10 (2006.01)
A41D 19/00 (2006.01)
A41D 31/02 (2019.01)
C08L 9/04 (2006.01)
C08J 5/02 (2006.01)
B32B 25/10 (2006.01)
B32B 25/16 (2006.01)
C08F 236/06 (2006.01)

(52) U.S. Cl.
CPC ............ C08L 9/10 (2013.01); A41D 19/0006 (2013.01); A41D 19/0065 (2013.01); A41D 31/02 (2013.01); C08J 5/02 (2013.01); C08L 9/04 (2013.01); A41D 2500/54 (2013.01); B32B 25/10 (2013.01); B32B 25/16 (2013.01); C08F 236/06 (2013.01); C08J 2309/04 (2013.01); C08J 2409/04 (2013.01); C08L 2205/025 (2013.01)

(58) Field of Classification Search
CPC .......... C08L 9/06; C08L 53/025; C08L 91/00; C08L 2207/04; C08F 10/06; C08F 12/08; C08F 22/06; A41D 19/0006; A41D 2500/54; A41D 31/02; A41D 19/0065
See application file for complete search history.

(56) References Cited

U.S. PATENT DOCUMENTS

| 3,663,656 A * | 5/1972 | Ford et al. ............ C08F 285/00 525/251 |
| 3,793,403 A * | 2/1974 | Dalton et al. ........... C08L 25/12 525/261 |
| 4,144,287 A * | 3/1979 | Kudo ...................... C08L 55/02 525/71 |
| 2014/0115751 A1 | 5/2014 | Saito et al. |
| 2015/0218352 A1 | 8/2015 | Enomoto et al. |
| 2019/0177517 A1* | 6/2019 | Igari ....................... C08L 13/02 |

FOREIGN PATENT DOCUMENTS

| CN | 104768985 A | 7/2015 |
| JP | 2014-111853 A | 6/2014 |
| JP | 2017-076059 A | 4/2017 |
| JP | 2017076059 A * | 4/2017 |
| KR | 10-2012-0129367 A | 11/2012 |

OTHER PUBLICATIONS

Aug. 31, 2021 extended Search Report issued in European Application No. EP 19738585.9.
Jul. 14, 2020 International Preliminary Report on Patentability issued in International Patent Application No. PCT/JP2019/000541.
Apr. 16, 2019 International Search Report issued in International Patent Application No. PCT/JP2019/000541.

* cited by examiner

*Primary Examiner* — Robert D Harlan
(74) *Attorney, Agent, or Firm* — Oliff PLC

(57) ABSTRACT

A latex composition including a latex (A) of a diene rubber (a) having a weight average molecular weight of 50,000 or more and 1,000,000 or less and containing an ethylenically unsaturated acid monomer unit; and a latex (B) of a diene rubber (b) having a weight average molecular weight of 500 or more and less than 50,000 and containing an ethylenically unsaturated acid monomer unit.

8 Claims, 1 Drawing Sheet

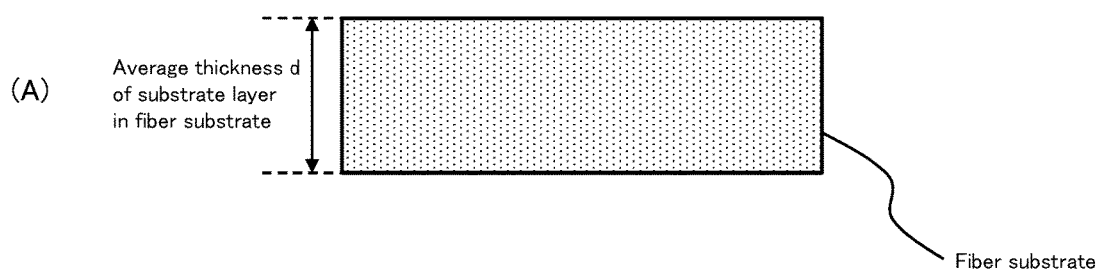
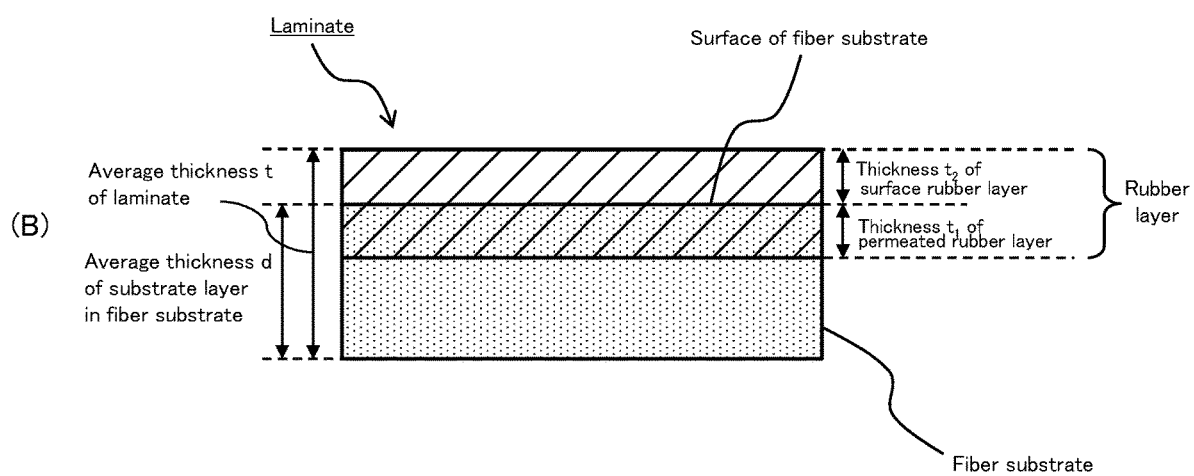

LATEX COMPOSITION

TECHNICAL FIELD

The present invention relates to a latex composition containing diene rubbers.

BACKGROUND ART

Conventionally, protective gloves whose solvent resistance, grip properties, wear resistance, and the like have been improved by coating fiber gloves with rubber, resin, or the like have been used as work gloves in various applications, such as manufacturing work in factories, light work, construction work, agricultural work, and the like.

For example, Patent Document 1 discloses a protective glove in which elastic yarns are knitted at least in a wrist portion and the elastic yarns are coated with rubber or resin.

RELATED ART DOCUMENTS

Patent Documents

Patent Document 1: Japanese Patent Laid-Open No. 2014-111853

SUMMARY OF THE INVENTION

Problem to be Solved by the Invention

A problem of existing protective gloves is that their surface rubber layer easily wears out with repeated use. One possible strategy to improve wear resistance is to form a thick rubber layer. This strategy, however, results in a glove which is likely to have cracks and has poor flexibility.

The present invention is completed in view of solving the above problems. It is an object of the present invention to provide a latex composition which provides a laminate having few or no cracks on the surface and having excellent flexibility and wear resistance.

Means for Solving Problems

As a result of intensive studies to achieve the above purpose, the present inventor has found that a laminate with a rubber layer which is less likely to have cracks in the rubber layer and has excellent flexibility and wear resistance can be obtained by using, as a diene rubber latex composition for forming a rubber layer, a latex composition containing the following two latices: a latex containing an acid group-containing diene rubber having a relatively high molecular weight; and a latex containing an acid group-containing diene rubber having a relatively low molecular weight. This finding has led to the completion of the present invention.

Specifically, the present invention provides a latex composition comprising:

a latex (A) of a diene rubber (a) having a weight average molecular weight of 50,000 or more and 1,000,000 or less and containing an ethylenically unsaturated acid monomer unit; and a latex (B) of a diene rubber (b) having a weight average molecular weight of 500 or more and less than 50,000 and containing an ethylenically unsaturated acid monomer unit.

In the latex composition according to the present invention, the diene rubber (a) and the diene rubber (b) are preferably present at a weight ratio [diene rubber (a)/diene rubber (b)] of 99/1 to 70/30.

In the latex composition according to the present invention, it is preferred that the ethylenically unsaturated acid monomer unit contained in the diene rubber (a) is a carboxyl group-containing ethylenically unsaturated monomer unit, and the ethylenically unsaturated acid monomer unit contained in the diene rubber (b) is a carboxyl group-containing ethylenically unsaturated monomer unit.

In the latex composition according to the present invention, it is preferred that the ethylenically unsaturated acid monomer unit contained in the diene rubber (b) is a carboxyl group-containing ethylenically unsaturated monomer unit, and the number of moles of carboxyl groups is 0.01 to 0.35 ephr per 100 g of the diene rubber (b).

In the latex composition according to the present invention, the diene rubber (a) is preferably a nitrile rubber further containing an $\alpha,\beta$-ethylenically unsaturated nitrile monomer unit.

In the latex composition according to the present invention, the diene rubber (b) is preferably a nitrile rubber further containing an $\alpha,\beta$-ethylenically unsaturated nitrile monomer unit.

The latex composition according to the present invention is preferably used to form a rubber layer on a fiber substrate.

The present invention also provides a laminate comprising a fiber substrate and a rubber layer laminated thereon, the fiber substrate comprising a plurality of fibers, the rubber layer being formed from the latex composition.

Effects of Invention

The present invention provides a latex composition which can provide a laminate having few or no cracks on the surface and having excellent flexibility and wear resistance.

BRIEF DESCRIPTION OF DRAWINGS

FIG. 1 shows a schematic view of a fiber substrate for use in the production of a laminate and a schematic view of a laminate.

DESCRIPTION OF EMBODIMENTS

The latex composition according to the present invention contains a latex (A) of a diene rubber (a) and a latex (B) of a diene rubber (b).

The diene rubber (a) has a weight average molecular weight of 50,000 or more and 1,000,000 or less, preferably 60,000 to 800,000, more preferably 70,000 to 500,000. Too high a weight average molecular weight of the diene rubber (a) tends to result in a laminate which is likely to have cracks and has poor flexibility. In contrast, too low a weight average molecular weight thereof tends to result in a laminate having poor wear resistance.

The ratio (Mw/Mn) of the weight average molecular weight (Mw) to the number average molecular weight (Mn) of the diene rubber (a) is preferably 1.5 to 5.0, more preferably 2.0 to 4.0. Control of the ratio (Mw/Mn) of the diene rubber (a) within the above ranges results in a laminate which is further resistant to cracking and has further enhanced flexibility and wear resistance.

The diene rubber (b) has a weight average molecular weight of 500 or more and less than 50,000, preferably 500 to 45,000, more preferably 1,000 to 40,000, still more preferably 1,500 to 30,000. Too high a weight average molecular weight of the diene rubber (b) tends to result in a laminate which is likely to have cracks and has poor flexibility. In contrast, too low a weight average molecular weight thereof tends to result in a laminate having poor wear resistance.

The ratio (Mw/Mn) of the weight average molecular weight (Mw) to the number average molecular weight (Mn) of the diene rubber (b) is preferably 1.0 to 3.0, more preferably 1.2 to 2.3, still more preferably 1.2 to 1.9. Control of the ratio (Mw/Mn) of the diene rubber (b) within the above ranges results in a laminate which is further resistant to cracking and has further enhanced flexibility and wear resistance.

The weight average molecular weights (Mw) and the number average molecular weights (Mn) of the diene rubber (a) and the diene rubber (b) can be determined as molecular weights calibrated against polystyrene standards by gel permeation chromatography using tetrahydrofuran as a developing solvent, for example. Examples of methods for controlling the weight average molecular weights and the ratios (Mw/Mn) of the diene rubber (a) and the diene rubber (b) include, but are not limited to, a method of controlling reaction factors involved in the polymerization reaction (e.g., the amount of chain transfer agent to be used); and the like.

Both the diene rubber (a) and the diene rubber (b) contain ethylenically unsaturated acid monomer units. The presence of the ethylenically unsaturated acid monomer units in the diene rubber (a) and the diene rubber (b) ensures high stability of the latex composition, and results in a laminate which is further resistant to cracking and has further enhanced flexibility and wear resistance. In particular, even when the latex composition contains additives such as zinc oxide, the presence thereof ensures sufficient stability of the latex composition.

The ethylenically unsaturated acid monomer units contained in the diene rubber (a) and the ethylenically unsaturated acid monomer units contained in the diene rubber (b) may be the same or different. Preferably, the diene rubbers contain the same ethylenically unsaturated acid monomer units. In this case, the diene rubbers are highly compatible with each other, and the desired effects of the present invention are easily obtained.

Examples of ethylenically unsaturated acid monomers for forming the ethylenically unsaturated acid monomer units include, but are not limited to, carboxyl group-containing ethylenically unsaturated monomers, sulfonic acid group-containing ethylenically unsaturated monomers, phosphoric acid group-containing ethylenically unsaturated monomers, and the like.

Examples of the carboxyl group-containing ethylenically unsaturated monomers include, but are not limited to, ethylenically unsaturated monocarboxylic acids, such as acrylic acid, methacrylic acid, and crotonic acid; ethylenically unsaturated polyvalent carboxylic acids and anhydrides thereof, such as fumaric acid, maleic acid, itaconic acid, maleic anhydride, and itaconic anhydride; partially esterified products of ethylenically unsaturated polyvalent carboxylic acids, such as methyl maleate and methyl itaconate; and the like.

Examples of the sulfonic acid group-containing ethylenically unsaturated monomers include, but are not limited to, vinylsulfonic acid, methylvinylsulfonic acid, styrenesulfonic acid, (meth)allylsulfonic acid, ethyl (meth)acrylate-2-sulfonate, 2-acrylamide-2-hydroxyproparesulfonic acid, and the like.

Examples of the phosphoric acid group-containing ethylenically unsaturated monomers include, but are not particularly limited to, propyl (meth)acrylate-3-chloro-2-phosphate, ethyl (meth)acrylate-2-phosphate, 3-allyloxy-2-hydroxypropane phosphoric acid, and the like.

These ethylenically unsaturated acid monomers may be used as alkali metal salts or ammonium salts, and may be used alone or in combination.

Among the above ethylenically unsaturated monomers, the carboxyl group-containing ethylenically unsaturated monomers are preferred as the ethylenically unsaturated acid monomers for forming the ethylenically unsaturated acid monomer units contained in the diene rubber (a). The ethylenically unsaturated monocarboxylic acids are more preferred, and methacrylic acid is particularly preferred.

Among the above ethylenically unsaturated monomers, the carboxyl group-containing ethylenically unsaturated monomers are preferred as the ethylenically unsaturated acid monomers for forming the ethylenically unsaturated acid monomer units contained in the diene rubber (b). The ethylenically unsaturated monocarboxylic acids are more preferred, and methacrylic acid is particularly preferred.

The proportion of ethylenically unsaturated acid monomer units contained in the diene rubber (a) and the proportion of ethylenically unsaturated acid monomer units contained in the diene rubber (b) may be the same or different. Preferably, the proportions thereof are different. In this case, a laminate which is further resistant to cracking and has further enhanced flexibility and wear resistance can be obtained.

In the case where both the diene rubber (a) and the diene rubber (b) contain the carboxyl group-containing ethylenically unsaturated monomer units, the ratio of the number of moles of carboxyl groups in the diene rubber (a) to the number of moles of carboxyl groups in the diene rubber (b) [number of moles of carboxyl groups in diene rubber (a)/number of moles of carboxyl groups in diene rubber (b)] is preferably 1.0 or less, more preferably less than 1.0, and may be 0.03 or more. Control of the ratio of the number of moles of carboxyl groups in the diene rubber (a) to that in the diene rubber (b) within the above ranges results in a laminate which is further resistant to cracking and has further enhanced flexibility and wear resistance. The number of moles of carboxyl groups indicates the number of moles of carboxyl groups per 100 g of each diene rubber.

The number of moles of carboxyl groups per 100 g of the diene rubber (a) is preferably 0.01 to 0.12 ephr, more preferably 0.03 to 0.10 ephr. Control of the number of moles of carboxyl groups in the diene rubber (a) within the above ranges results in a laminate which is further resistant to cracking and has further enhanced flexibility and wear resistance.

The number of moles of carboxyl groups per 100 g of the diene rubber (b) is preferably 0.01 to 0.35 ephr, more preferably 0.03 to 0.20 ephr. Control of the number of moles of carboxyl groups in the diene rubber (b) within the above ranges results in a laminate which is further resistant to cracking and has further enhanced flexibility and wear resistance.

The numbers of moles of carboxyl groups in the diene rubber (a) and the diene rubber (b) can be determined by titration using thymolphthalein as an indicator, for example.

The proportion of the ethylenically unsaturated acid monomer units contained in the diene rubber (a) is preferably 2 to 15 wt %, more preferably 3 to 7 wt %, still more preferably 4 to 6 wt % of the total monomer units. Control of the proportion of the ethylenically unsaturated acid monomer units contained in the diene rubber (a) within the above ranges results in a laminate which is further resistant to cracking and has further enhanced flexibility and wear resistance.

The proportion of the ethylenically unsaturated acid monomer units contained in the diene rubber (b) is preferably 2 to 15 wt %, more preferably more than 7 wt % and 13 wt % or less, still more preferably 7.5 to 11 wt % of the total monomer units. Control of the proportion of the ethylenically unsaturated acid monomer units contained in the diene rubber (b) within the above ranges results in a laminate which is further resistant to cracking and has further enhanced flexibility and wear resistance.

The diene rubber (a) and the diene rubber (b) are not particularly limited as long as they contain the ethylenically unsaturated acid monomer units. Examples thereof include natural rubber; conjugated diene rubbers obtained by polymerization or copolymerization of conjugated dienes such as butadiene and isoprene; and the like. Among these, preferred are the conjugated diene rubbers. Examples of the conjugated diene rubbers include so-called nitrile rubber obtained by copolymerization of nitriles, isoprene rubber, styrene-butadiene rubber, chloroprene rubber, and the like. Among these, nitrile rubber is particularly preferred. Namely, the diene rubber (a) and the diene rubber (b) are preferably nitrile rubbers further containing α,β-ethylenically unsaturated monomer units in addition to the ethylenically unsaturated acid monomer units.

Examples of α,β-ethylenically unsaturated nitrile monomers that can be used to form the α,β-ethylenically unsaturated nitrile monomer units include, but are not limited to, ethylenically unsaturated compounds having a nitrile group and preferably having 3 to 18 carbon atoms. Examples of such α,β-ethylenically unsaturated nitrile monomers include acrylonitrile, methacrylonitrile, halogen-substituted acrylonitriles, and the like. Among these, acrylonitrile is particularly preferred. Note that these α,β-ethylenically unsaturated nitrile monomers may be used alone or in combinations.

The proportion of the α,β-ethylenically unsaturated nitrile monomer units contained in the diene rubber (a) is preferably 10 to 45 wt %, more preferably 20 to 40 wt % of the total monomer units. Control of the proportion of α,β-ethylenically unsaturated nitrile monomer units contained in the diene rubber (a) within the above ranges results in a laminate which is further resistant to cracking and has further enhanced flexibility and wear resistance.

The proportion of the α,β-ethylenically unsaturated nitrile monomer units contained in the diene rubber (b) is preferably 10 to 45 wt %, more preferably 20 to 40 wt % of the total monomer units. Control of the proportion of α,β-ethylenically unsaturated nitrile monomer units contained in the diene rubber (b) within the above ranges results in a laminate which is further resistant to cracking and has further enhanced flexibility and wear resistance.

The diene rubber (a) and the diene rubber (b) may further contain conjugated diene monomer units in addition to the ethylenically unsaturated acid monomer units.

Preferred conjugated diene monomers for forming the conjugated diene monomer units are conjugated diene monomers having 4 to 6 carbon atoms such as 1,3-butadiene, isoprene, 2,3-dimethyl-1,3-butadiene, 1,3-pentadiene, chloroprene, and the like. 1,3-Butadiene and isoprene are more preferred, and 1,3-butadiene is particularly preferred. Note that these conjugated diene monomers may be used alone or in combinations.

The proportion of the conjugated diene monomer units contained in the diene rubber (a) is preferably 40 to 80 wt %, more preferably 53 to 77 wt %, still more preferably 54 to 76 wt % of the total monomer units. Control of the proportion of conjugated diene monomer units contained in the diene rubber (a) within the above ranges results in a laminate which is further resistant to cracking and has further enhanced flexibility and wear resistance.

The proportion of the conjugated diene monomer units contained in the diene rubber (b) is preferably 40 to 80 wt %, more preferably 52 wt % or more and less than 73 wt %, still more preferably 52 to 70 wt % of the total monomer units. Control of the proportion of conjugated diene monomer units contained in the diene rubber (b) within the above ranges results in a laminate which is further resistant to cracking and has further enhanced flexibility and wear resistance.

The diene rubber (a) and the diene rubber (b) may further contain other monomer units in addition to the ethylenically unsaturated acid monomer units, the ethylenically unsaturated nitrile monomer units, and the conjugated diene monomer units.

Other monomers for forming the other monomer units may be any monomer that is copolymerizable with the ethylenically unsaturated acid monomer, the conjugated diene monomer, and the α,β-ethylenically unsaturated nitrile monomer. Examples thereof include, but are not limited to, the following monomers.

Specifically, examples of the other monomers includes aromatic vinyl monomers such as styrene, α-methylstyrene, monochlorostyrene, dichlorostyrene, trichlorostyrene, monomethylstyrene, dimethylstyrene, trimethylstyrene, and hydroxymethylstyrene; ethylenically unsaturated carboxylic acid amide monomers such as acrylamide, methacrylamide, N,N-dimethylacrylamide, and N-methylolacrylamide; ethylenically unsaturated carboxylic acid alkyl ester monomers such as methyl (meth)acrylate, ethyl (meth)acrylate, butyl (meth)acrylate, and 2-ethylhexyl (meth)acrylate; carboxylic acid vinyl ester monomers such as vinyl acetate, vinyl propionate, and vinyl versatate; halogenated vinyl monomers such as vinyl chloride, vinylidene chloride, vinyl fluoride, and vinylidene fluoride; olefin monomers such as ethylene, propylene, 1-butene, and isobutene; vinyl ether monomers such as methyl vinyl ether, n-propyl vinyl ether, isobutyl vinyl ether, and dodecyl vinyl ether; (meth)allyl compounds such as allyl acetate, methallyl acetate, allyl chloride, and methallyl chloride; vinylsilyl compounds such as vinyltrimethoxysilane; vinyl pyridine and N-vinyl pyrrolidone; and the like. Among these, from the viewpoint of providing a laminate with further increased strength, aromatic vinyl monomers are preferred. These other monomers may be used alone or in combination.

In order to provide a laminate which is further resistant to cracking and has further enhanced flexibility and wear resistance, the diene rubber (a) and the diene rubber (b) contain the other monomer units in an amount of preferably 26 wt % or less, more preferably 10 wt % or less, still more preferably 7 wt % or less, particularly preferably 5 wt % or less of the total monomer units.

The volume average particle size of particles of the diene rubber (a) contained in the latex (A) is preferably 70 to 300 nm, more preferably 80 to 200 nm. As a result of controlling the volume average particle size of the particle of the diene rubber (a) within the above ranges, the latex composition has appropriate viscosity and thus further improved handling properties, and can be formed into a rubber layer with improved moldability, resulting in a laminate with a more homogeneous rubber layer.

The volume average particle size of particles of the diene rubber (b) contained in the latex (B) is preferably 70 to 300 nm, more preferably 80 to 200 nm. As a result of controlling the volume average particle size of the particle of the diene rubber (b) within the above ranges, the latex composition has appropriate viscosity and thus further improved handling properties, and can be formed into a rubber layer with improved moldability, resulting in a laminate with a more homogeneous rubber layer.

The latex (A) and the latex (B) are preferably present in the latex composition according to the present invention at such a ratio that the weight ratio of the diene rubber (a) in the latex (A) to the diene rubber (b) in the latex (B) [diene rubber (a)/diene rubber (b)] falls within the range of 99/1 to 70/30. In other words, the weight ratio [diene rubber (a)/diene rubber (b)] of the diene rubber (a) and the diene rubber (b) contained in the latex composition according to the present invention is preferably in the range of 99/1 to 70/30, more preferably 97/3 to 75/25, still more preferably 95/5 to 80/20, particularly preferably 92/8 to 87/13. Control of the ratio of the diene rubber (a) to the diene rubber (b) within the above ranges results in a laminate which is further resistant to cracking and having further enhanced flexibility and wear resistance.

Although not particularly limited thereto, the latex composition used in the present invention may be, for example, a latex prepared by mixing the latex (A) of the diene rubber (a) prepared through polymerizing a monomer mixture containing the above monomers and the latex (B) of the diene rubber (b) prepared through polymerizing a monomer mixture containing the above monomers. The latex (A) and the latex (B) may be latices prepared through emulsion polymerization of the above monomer mixtures, latices prepared through phase inversion emulsification of diene rubber solutions prepared through solution polymerization of the above monomer mixtures, or the like.

In the case of using latices prepared through emulsion polymerization, the compositions of the resulting diene rubbers can be easily controlled by adjusting the compositions of the monomer mixtures used in emulsion polymerization. Any conventionally known method for emulsion polymerization can be used.

During emulsion polymerization of the above monomer mixtures, ordinarily used polymerization additives, such as an emulsifier, a polymerization initiator, and a molecular weight modifier, can be used. These polymerization additives may be added in any manner, and any of initial single addition, portion-wise addition, continuous addition, and the like may be used.

Examples of the emulsifier include, but are not limited to, anionic surfactants, nonionic surfactants, cationic surfactants, amphoteric surfactants, and the like. Among these, preferred are anionic surfactants such as alkylbenzene sulfonates, aliphatic sulfonates, sulfuric acid ester salts of higher alcohols, α-olefin sulfonates, and alkyl ether sulfuric acid ester salts.

The amount of emulsifier to be used is preferably 0.5 to 10 parts by weight, more preferably 1 to 8 parts by weight relative to 100 parts by weight of the total monomers to used.

The polymerization initiator is preferably a radical initiator, although not particularly limited thereto. Examples of the radical initiator include, but are not limited to, inorganic peroxides such as sodium persulfate, potassium persulfate, ammonium persulfate, potassium perphosphate, and hydrogen peroxide; organic peroxides such as diisopropylbenzene hydroperoxide, cumene hydroperoxide, t-butyl hydroperoxide, 1,1,3,3-tetramethylbutyl hydroperoxide, 2,5-dimethylhexane-2,5-dihydroperoxide, di-t-butyl peroxide, di-α-cumyl peroxide, acetyl peroxide, isobutyryl peroxide, and benzoyl peroxide; azo compounds such as azobisisobutyronitrile, azobis-2,4-dimethylvaleronitrile, and methyl azobisisobutyrate; and the like. Among these, preferred are inorganic peroxides and organic peroxides, more preferred are inorganic peroxides, and particularly preferred are persulfates. In the case where a peroxide is used as the polymerization initiator, a combination thereof with a reducing agent such as sodium bisulfite, sodium hypochlorite, ferrous sulfate, or sodium formaldehyde sulfoxylate can be used as a redox polymerization initiator. Additionally, a chelating agent such as sodium ethylenediaminetetraacetate and a builder such as sodium carbonate or sodium sulfate may be used in combination therewith. These polymerization initiators may be used alone or in combination.

The amount of polymerization initiator to be used is 0.01 to 2 parts by weight, more preferably 0.05 to 1.5 parts by weight relative to 100 parts by weight of the total monomers used.

Examples of the molecular weight modifier include, but are not to, α-methyl styrene dimer; mercaptans such as t-dodecyl mercaptan, n-dodecyl mercaptan, and octyl mercaptan; halogenated hydrocarbons such as carbon tetrachloride, methylene chloride, and methylene bromide; sulfur-containing compounds such as tetraethylthiuram disulfide, dipentamethylenethiuram disulfide, and diisopropyl xanthogen disulfide, and the like. Among these, mercaptans are preferred, and t-dodecylmercaptan is more preferred. These molecular weight modifiers may be used alone or in combination.

The amount of molecular weight modifier to be used varies depending on the type thereof. For the preparation of the latex (A), the amount thereof is preferably 0.1 to 1.5 parts by weight, more preferably 0.2 to 1.0 part by weight relative to 100 parts by weight of the total monomers to be used. For the preparation of the latex (B), the amount thereof is preferably 3 to 15 parts by weight, more preferably 8 to 12 parts by weight relative to 100 parts by weight of the total monomers to be used.

The emulsion polymerization is usually carried out in water. The amount of water to be used is preferably 80 to 500 parts by weight, more preferably 100 to 200 parts by weight relative to 100 parts by weight of the total monomers to be used.

In the emulsion polymerization, optionally, polymerization additives other than the above agents may be further used. Examples of such polymerization additives include chelating agents, dispersants, pH regulators, deoxidizing agents, particle size adjusting agents, and the like. The types and the amounts of those polymerization additives to be used are not particularly limited.

Examples of methods for adding the monomers include a method of adding the monomers used in the reaction vessel at a time, a method of continuously or intermittently adding the monomers according to the progress of polymerization, a method in which the reaction is carried out up to a specific conversion ratio by adding a part of the monomers and then the remaining monomers are continuously or intermittently added and polymerized, and the like. Any of these methods may be employed. In the case of mixing and adding the monomers continuously or intermittently, the composition of the mixture may be constant or may be changed.

Further, the monomers used may be mixed and then added to the reaction vessel, or each monomer may be individually added to the reaction vessel.

Any polymerization temperature during emulsion polymerization can be used without particular limitation. It is usually 0 to 95° C., preferably 5 to 70° C. Any polymerization time can be used without particular limitation. It is usually about 5 to 40 hours.

When the monomers are emulsion polymerized as described above to a predetermined polymerization conversion ratio, the polymerization reaction is stopped by cooling the polymerization system or by adding a polymerization terminator. The polymerization conversion ratio at which the polymerization reaction is stopped is typically 80% by weight or more, preferably 90% by weight or more.

The polymerization terminator may be any polymerization terminator usually used in emulsion polymerization. Specific examples thereof include, but are not limited to, hydroxylamine compounds such as hydroxylamine, hydroxylamine sulfate, diethylhydroxylamine, and hydroxylamine sulfonic acid and alkali metal salts thereof; sodium dimethyldithiocarbamate; hydroquinone derivatives; catechol derivatives; aromatic hydroxy dithiocarboxylic acid compounds such as aromatic hydroxy dithiocarboxylic acids (e.g., hydroxydimethyl benzene thiocarboxylic acid, hydroxydiethyl benzene dithiocarboxylic acid, and hydroxydibutyl benzene dithiocarboxylic acid) and alkali metal salts thereof; and the like.

The amount of polymerization terminator to be used is not particularly limited, but it is usually 0.05 to 2 parts by weight relative to 100 parts by weight of the total monomers to be used.

After stopping the polymerization reaction, if desired, unreacted monomers may be removed, and the solids content and pH may be adjusted.

The solids content of the latex composition is usually 20 to 65% by weight, preferably 30 to 60% by weight, more preferably 35 to 55% by weight. By controlling the solids content of the latex composition within the above ranges, the transport efficiency of the latex can be improved, and the viscosity of the latex composition is controlled to an appropriate level, resulting in improved handling properties of the latex composition.

The pH of the latex composition is usually 5 to 13, preferably 7 to 10, more preferably 7.5 to 9. By controlling the pH of the latex composition within the ranges, the mechanical stability is improved, suppressing the occurrence of coarse agglomerates during transfer of the latex composition, and the viscosity of the latex composition is controlled to an appropriate level, resulting in improved handling properties of the latex composition.

To the latex composition used in the present invention may be further added a cross-linking agent, a crosslinking accelerator, zinc oxide, and the like.

The cross-linking agent is preferably a sulfur cross-linking agent. Examples of such sulfur cross-linking agents include, but are not limited to, sulfur such as powdered sulfur, sublimed sulfur, precipitated sulfur, colloidal sulfur, surface-treated sulfur, and insoluble sulfur; sulfur-containing compounds such as sulfur chloride, sulfur dichloride, morpholine disulfide, alkylphenol disulfide, dibenzothiazyl disulfide, N,N'-dithio-bis(hexahydro-2H-azepinone-2), phosphorus-containing polysulfide, and polysulfide polymers; sulfur donating compounds such as tetramethylthiuram disulfide, selenium dimethyldithiocarbamate, and 2-(4'-morpholinodithio)benzothiazole; and the like. These cross-linking agents may be used alone or in combination.

The amount of sulfur cross-linking agent to be added is preferably 0.01 to 5 parts by weight, more preferably 0.05 to 3 parts by weight, particularly preferably 0.1 to 2 parts by weight relative to 100 parts by mass of the total solids in the latex composition. The use of the sulfur cross-linking agent in an amount within the above ranges results in a laminate which is further resistant to cracking and having further enhanced flexibility and wear resistance.

It is preferred that the sulfur cross-linking agent be dispersed in a solvent and be added as a dispersion. The addition of the sulfur cross-linking agent as a dispersion results in a laminate which is less likely to have defects, such as cracks, pin holes, and adhering agglomerates, in a resulting rubber layer.

Any method for preparing a dispersion of the sulfur cross-linking agent can be used. Preferred is a method involving adding a solvent to the sulfur cross-linking agent, and pulverizing and stirring the sulfur cross-linking agent with a wet pulverizer, such as a ball mill or a bead mill.

When sulfur is used as the sulfur cross-linking agent, it is preferably used together with a cross-linking accelerator (vulcanization accelerator) or zinc oxide.

Examples of the cross-linking accelerator (vulcanization accelerator) include, but are not limited to, dithiocarbamic acids and zinc salts thereof, such as diethyl dithiocarbamic acid, dibutyl dithiocarbamic acid, di-2-ethylhexyl dithiocarbamic acid, dicyclohexyl dithiocarbamic acid, diphenyl dithiocarbamic acid, and dibenzyl dithiocarbamic acid; 2-mercaptobenzothiazole, zinc 2-mercaptobenzothiazole, 2-mercaptothiazoline, dibenzothiazyl disulfide, 2-(2,4-dinitrophenylthio)benzothiazole, 2-(N,N-diethylthio-carbamoylthio)benzothiazole, 2-(2,6-dimethyl-4-morpholinothio) benzothiazole, 2-(4'-morpholino-dithio)benzothiazole, 4-morpholinyl-2-benzothiazyl disulfide, 1,3-bis(2-benzothiazyl-mercaptomethyl) urea, and the like. Among these, preferred are zinc diethyl dithiocarbamate, zinc dibutyl dithiocarbamate, 2-mercaptobenzothiazole, and zinc 2-mercaptobenzothiazole. These crosslinking accelerators may be used alone or in combination.

The amount of cross-linking accelerator to be used is preferably 0.1 to 10 parts by weight, more preferably 0.5 to 5 parts by weight relative to 100 parts by weight of the total solids in the latex composition.

The amount of zinc oxide to be used is preferably 5 parts by weight or less, more preferably 0.1 to 3 parts by weight, still more preferably 0.5 to 2 parts by weight relative to 100 parts by weight of the total solids in the latex composition.

In the case where the latex composition contains the cross-linking agent, the latex composition may be aged in advance (this process is also referred to as prevulcanization).

The temperature during the aging is preferably 20 to 50° C., although not particularly limited thereto. From the viewpoint of preventing peeling between the fiber substrate and the rubber layer and providing a laminate having improved wear resistance, the aging time is preferably 4 hours or more and 120 hours or less, more preferably 24 hours or more and 72 hours or less. By performing the aging for a time within the above ranges, the rubber layer is allowed to suitably permeate into the fiber substrate, which prevents peeling between the fiber substrate and the rubber layer and improves the wear resistance of the resulting laminate.

In order to control the viscosity of the latex composition within a desired range, a viscosity modifier may be added to the latex composition. Examples of the viscosity modifier include, but are not limited to, carboxymethyl cellulose thickeners, polycarbonic acid thickeners, polysaccharide thickeners, and the like. The viscosity of the latex composition is preferably 500 to 8000 m-Pa, more preferably 2500 to 7000 m-Pa. In particular, when the latex composition contains additives such as the above-described cross-linking agent, cross-linking accelerator, zinc oxide, and viscosity modifier, it is preferred that the viscosity of the latex composition be controlled within the above ranges.

To the latex composition may be added a filler such as carbon black, silica, calcium carbonate, aluminum silicate, magnesium silicate, calcium silicate, magnesium oxide, zinc (meth)acrylate, or magnesium (meth)acrylate. Optionally, predetermined amounts of various additives, such as an anti-aging agent, an antioxidant, a preservative, an antibacterial agent, a wetting agent, a dispersant, a pigment, a dye, a filler, a reinforcing material, and a pH regulator may be further added to the latex composition.

The latex composition containing the cross-linking agent has a solids content of preferably 25 to 55 wt %, more preferably 35 to 55 wt %. The latex composition containing the cross-linking agent preferably has a surface tension of 25 to 40 mN/m.

The latex composition according to the present invention can be used to form a rubber layer on a fiber substrate, thereby providing a laminate comprising the fiber substrate and the rubber layer. In particular, a laminate where a fiber substrate comprising a plurality of fibers and a rubber layer formed from the latex composition are laminated has few or no cracks on the surface and has excellent flexibility and wear resistance. For this reason, such a laminate can be suitably used as a glove such as a work glove. Namely, the latex composition according to the present invention may be a latex composition for forming a rubber layer on a fiber substrate.

In addition, the latex composition according to the present invention can be used to manufacture gloves. Namely, the latex composition according to the present invention may be a latex composition for gloves and may be a latex composition for work gloves. Additionally, such gloves may be gloves (protective gloves) comprising the above laminate.

The fiber substrate is not particularly limited as long as it is made of fibers. The following fibers can be used as constituent fibers for the fiber substrate: natural fibers such as cotton, hair, hemp, and wool; synthetic fibers such as polyester, polyurethane, acrylic, and nylon fibers; and the like. Among these, nylon is preferably used.

The fibers constituting the fiber substrate may be in the form of filaments (strings of fibers drawn out from the above natural fibers, synthetic fibers, or the like) or twisted yarns composed of a plurality of filaments, and may be in the form of a woven fabric or a non-woven fabric. Preferably, the fibers are twisted yarns.

The fiber substrate preferably has a thickness of 0.1 to 2.0 mm, although not particularly limited thereto. The fiber substrate preferably has a linear density of 50 to 500 denier, although not particularly limited thereto. The fiber substrate preferably has a gauge number of 7 to 18, although not particularly limited thereto. Here, the gauge number refers to the number of needles per 1 inch in a knitting machine.

In the above laminate, it is preferred that the rubber layer be formed covering the fiber substrate in a state where a portion of the rubber layer permeates between the fibers. FIGS. 1(A) and 1(B) are a schematic view of a fiber substrate and that of a laminate, respectively. FIG. 1(A) is a cross-sectional view of a fiber substrate. FIG. 1(B) is a cross-sectional view of a laminate comprising a rubber layer formed on the fiber substrate shown in FIG. 1(A). In the laminate shown in FIG. 1(B), the rubber layer is formed covering the fiber substrate in a state where a part of the rubber layer has permeated between the fibers constituting the fiber substrate. In FIG. 1(B), in the rubber layer constituting the laminate, a portion of the rubber layer permeating from the surface of the fiber substrate into the gaps between the fibers is referred to as a permeated rubber layer, and of the rubber layer, a portion covering the fiber substrate from the surface of the fiber substrate is referred to as a surface rubber layer. Note that, in the present invention, the rubber layer is described as being composed of a permeated rubber layer and a surface rubber layer as appropriate, but in general, the permeated rubber layer and the surface rubber layer are formed as one body.

In the above laminate, the permeated rubber layer has a thickness $t_1$ of preferably 50 to 600 µm, more preferably 100 to 550 µm, still more preferably 200 to 500 µm. When the thickness $t_1$ of the permeated rubber layer is controlled within the above ranges, the resulting laminate exhibits further enhanced durability when it is used as a glove (protective glove) such as a work glove.

In the above laminate, the thickness of the portion of the rubber layer covering the surface of the fiber substrate, in other words, the thickness $t_2$ of the surface rubber layer (shown in FIG. 1) is preferably 80 to 600 µm, more preferably 100 to 550 µm, still more preferably 150 to 500 µm, particularly preferably 200 to 500 µm. When the thickness $t_2$ of the surface rubber layer is controlled within the above ranges, the resulting laminate exhibits further enhanced durability when it is used as a glove (protective glove) such as a work glove. By using the latex composition according to the present invention, a laminate comprising a rubber layer having few or no cracks on the surface can be formed even when the rubber layer has a thickness of 150 µm or more, preferably 200 µm or more.

Although the thickness ratio between the permeated rubber layer and the surface rubber layer in the rubber layer is not particularly limited, the ratio ($t_2/t_1$) of the thickness $t_2$ of the surface rubber layer to the thickness $t_1$ of the permeated rubber layer is preferably 0.2 to 5, more preferably 0.3 to 2. When the thickness ratio between the permeated rubber layer and the surface rubber layer is controlled within the above ranges, the laminate exhibits highly balanced durability and flexibility when it is used as a work glove.

The thickness of the rubber layer as a whole, that is, the total of the thickness $t_1$ of the permeated rubber layer and the thickness $t_2$ of the surface rubber layer is preferably 150 µm or more, although not particularly limited thereto.

For example, the above laminate can be produced by a production method involving depositing a coagulant solution on the fiber substrate, and then contacting the latex composition with the fiber substrate with the coagulant solution deposit thereon to solidify the diene rubbers, thereby forming a rubber layer on the fiber substrate. Alternatively, the laminate can be produced by a production method involving depositing the latex composition on the fiber substrate and then contacting the coagulant solution with the fiber substrate with the latex composition deposit thereon to solidify the diene rubbers, thereby forming a rubber layer on the fiber substrate. In these methods, the rubber layer is formed to cover the fiber substrate in a state where a part thereof has penetrated the fiber substrate. The rubber layer can be formed in a state where the fiber substrate is placed to cover a mold with a predetermined shape.

The coagulant solution is a solution of a coagulant dispersed or dissolved in a solvent.

The coagulant may be any coagulant which can cause the diene rubbers in the latex composition to solidify. A metal salt or the like can be used, although not particularly limited thereto. Examples of constituent metal species for the metal salt include, but are not limited to, monovalent metals such as lithium, sodium, and potassium; divalent metals such as magnesium, calcium, zinc, iron, barium, zirconium, and copper; trivalent metals such as aluminum; and the like. Examples of constituent salt species for the metal salt include, but are not limited to, nitrate, sulfate, those of organic acids such as acetate, and the like. Among these, preferred metal species are polyvalent metals. Divalent metals are more preferred, and calcium is particularly preferred. Preferred salt species are nitrate and chloride, and nitrate is particularly preferred. In other words, the metal salt is preferably a polyvalent metal salt, and more preferably a divalent metal nitrate or a halide salt.

Specific examples of such metal salts include nitrates such as calcium nitrate, barium nitrate, and zinc nitrate; metal halide salts such as barium chloride, calcium chloride, magnesium chloride, zinc chloride, and aluminum chloride; acetates such as barium acetate, calcium acetate, and zinc acetate; sulfates such as calcium sulfate, magnesium sulfate, and aluminum sulfate; and the like. Among these, nitrates and metal halide salts are preferred, calcium nitrate and calcium chloride are more preferred, and calcium nitrate is particularly preferred.

These metal salts may be used alone or in combination.

The coagulant solution may further contain an organic acid in addition to the above coagulant. Preferred examples of the organic acid include, but are not limited to, organic acids having at least one group selected from a carboxyl group, a sulfo group, a hydroxy group, and a thiol group. Specific examples include acetic acid, formic acid, propionic acid, citric acid, oxalic acid, and the like. Among these, acetic acid is preferred.

Examples of the solvent for dissolving or dispersing the coagulant include, but are not limited to, water, alcohols such as methanol and ethanol, mixtures thereof, and the like. Among these, water and alcohols are preferred, alcohols are more preferred, and methanol is particularly preferred.

The coagulant is present in the coagulant solution at a concentration of typically 0.2 to 10.0 wt %, preferably 0.5 to 7.0 wt %.

Examples of methods for depositing the coagulant solution or the latex composition on the fiber substrate include, but are not limited to, a method of immersing the fiber substrate in the coagulant solution or the latex composition; and the like.

In the case where the fiber substrate is immersed in the coagulant solution or the latex composition, the immersion time is preferably 1 to 30 seconds, more preferably 1 to 10 seconds, although not particularly limited thereto.

In the case where the coagulant solution is deposited on the fiber substrate, it is preferred that the solvent in the coagulant solution be removed by drying after deposition. In this case, the drying temperature can be selected according to the solvent used, and is preferably 10 to 80° C., more preferably 15 to 70° C., although not particularly limited thereto. The drying time is preferably 1 second to 120 minutes, more preferably 5 seconds to 60 minutes, although not particularly limited thereto.

Likewise, it is preferred that after depositing the latex composition on the fiber substrate, the latex composition be dried. In this case, the drying temperature is preferably 180° C. or lower, more preferably 10 to 170° C., although not particularly limited thereto. The drying time is preferably 1 second to 60 minutes, more preferably 3 seconds to 30 minutes.

In the case where the latex composition is deposited on the fiber substrate and the latex composition deposit on the fiber substrate is then contacted with the coagulant solution, the drying is followed by contacting the latex composition deposit on the fiber substrate with the coagulant solution to cause the diene rubbers in the latex composition to solidify, thereby forming a rubber layer. In this process, it is preferred that the coagulant solution be contacted with and deposited on the latex composition deposit on the fiber substrate, and then the solvent in the coagulant solution be removed by drying. In this case, the drying temperature can be selected according to the solvent used, and is preferably 10 to 80° C., more preferably 15 to 70° C., although not particularly limited thereto. The drying time is preferably 1 to 600 seconds, more preferably 5 to 300 seconds, although not particularly limited thereto.

When the coagulant solution or the latex composition is deposited on the fiber substrate, it is preferred that the fiber substrate be placed to cover a mold with a desired shape in advance, and the fiber substrate in this state be immersed in the coagulant solution or the latex composition.

The mold covered with the fiber substrate may be made of any of a variety of materials including, but not limited to, ceramics, glass, metals, plastics, and the like. The shape of the mold may be a desired shape corresponding to the shape of a final product. For example, in the case where the laminate is intended to be used as a protective glove, the mold which the fiber substrate covers is preferably a mold corresponding to any of a variety of types of gloves such as a mold having a shape of a wrist to finger tips, or the like.

In the case where the latex composition further contains the cross-linking agent, it is preferred that the diene rubbers in the latex composition be cross-linked by heating the latex composition deposit on the fiber substrate.

The heating temperature for cross-linking is preferably 60 to 160° C., more preferably 80 to 150° C. By controlling the heating temperature within the above ranges, the time required for the cross-linking reaction can be shortened, thereby improving the productivity of the laminate. In addition, excessive heating which causes oxidative degradation of the diene rubbers can be avoided, thereby improving the physical properties of the resulting laminate. Although the heating time for cross-linking may be appropriately selected according to the heating temperature, it is typically 5 to 120 minutes.

In the production method according to the present invention, after formation of the rubber layer on the fiber substrate, the rubber layer is preferably immersed in warn water at a temperature of 20 to 80° C. for 0.5 to 60 minutes to remove water-soluble impurities (such as the emulsifier, water-soluble polymers, and the coagulant) from the rubber layer. In the case where the latex composition contains the cross-linking agent, such an immersion treatment of the rubber layer in warm water is preferably performed before cross-linking the rubber layer to more efficiently remove the water-soluble impurities although it may be performed after cross-linking the rubber layer.

In addition, in the case where the rubber layer is formed in a state where the fiber substrate is placed on the mold, the laminate can be obtained by removing the fiber substrate having the rubber layer formed thereon from the mold. As a removal method, a method of peeling the laminate from the mold by hand or a method of peeling the laminate by water pressure or pressure of compressed air can be employed.

After removed from the mold, the laminate may be subjected to a heating treatment (post-cross-linking step) at 60 to 120° C. for 10 to 120 minutes. In addition, a surface-treatment layer may be formed on the inner surface and/or the outer surface of the laminate by a treatment such as a chlorinating treatment or a coating treatment.

The present invention can provide a laminate which is resistant to cracking and has excellent flexibility and wear resistance by using, as a diene rubber latex composition for forming a rubber layer, a latex composition containing the following two latices: a latex containing an acid group-containing diene rubber having a relatively high molecular weight; and a latex containing an acid group-containing diene rubber having a relatively low molecular weight. Owing to these properties, the resulting laminate can be suitably used as work gloves, in particular, protective gloves for household, agricultural, fishery, industrial use, and the like.

EXAMPLES

The present invention is hereinafter illustrated in specific detail with reference to Examples and Comparative Examples. In the following examples, all "parts" are on a weight basis unless otherwise indicated. The tests and the evaluations were performed according to the following methods.

Solids Content 2 g of a sample (weight: X2) was precisely weighed on an aluminum plate (weight: X1), and was dried in a hot air dryer at 105° C. for two hours. The sample was then cooled inside a desiccator, and the weight of the sample with the aluminum plate (weight: X3) was measured to calculate the solids content from the expression:

Solids content(wt %)=($X3$−$X1$)×100/$X2$

Measurement of Content of 1,3-Butadiene Units

The content of 1,3-butadiene units was calculated by measuring the iodine value of each diene rubber (according to JIS K 6235).

Measurement of Content of Acrylonitrile Units

The content of acrylonitrile units was calculated by measuring the nitrogen content of each diene copolymer by the Kjeldahl method according to JIS K 6384.

Measurement of Number of Moles of Carboxyl Groups and Content of Methacrylic Acid Units A 2 mm square diene rubber with a weight of 0.2 g was combined with 100 ml of 2-butanone, and was stirred for 16 hours. Thereafter, 20 ml of ethanol and 10 ml of water were added thereto, and the resulting mixture was titrated, with stirring, with a 0.02 N hydrous ethanol solution of potassium hydroxide at room temperature in the presence of thymolphthalein as an indicator to determine the number of moles of carboxyl groups (unit: ephr) per 100 g of the diene rubber. The content of methacrylic acid units in the diene rubber was calculated by converting the determined number of moles into the amount of methacrylic acid units.

Measurement of Number Average Molecular Weight (Mn), Weight Average Molecular Weight (Mw), and Molecular Weight Distribution (Mw/Mn)

Each diene rubber was dissolved in tetrahydrofuran, and was passed through a membrane filter. The filtrate was measured by gel permeation chromatography under the conditions shown below to determine the number average molecular weight (Mn), the weight average molecular weight (Mw), and the molecular weight distribution (Mw/Mn) of the diene rubber. The number average molecular weight (Mn) and the weight average molecular weight (Mw) were calibrated against polystyrene standards.

Measurement device: "Alliance 2695" (available from Waters)

Column: two columns "Plgel Mini Mix-C GUARD" (product name) (available from Agilent Technologies) and "Plgel Mini Mix-C" (product name) (available from Agilent Technologies) connected in series Detector: differential refractometer RI Eluent: tetrahydrofuran Column temperature: 40° C.

Volume Average Particle Size

The volume average particle size was determined using a laser diffraction/scattering particle size analyzer (LS-13 320, available from Beckman Coulter, Inc.).

Thickness $t_1$ of Permeated Rubber Layer and Thickness $t_2$ of Surface Rubber Layer For each of the gloves produced in Examples and Comparative Examples, the thickness $t_1$ of the permeated rubber layer and the thickness $t_2$ of the surface rubber layer were measured by observing a cross-section of the rubber layer taken in a palm portion at a position 12 cm away from the tip of the middle finger using an optical microscope (VHX-200, available from Keyence Corporation). Describing a specific measurement method with reference to FIG. 1, the thickness $t_1$ of the permeated rubber layer was determined by measuring the distance from the surface of the fiber substrate to the deepest portion of the permeated rubber at ten sites, and calculating the number average value of the measurement results. The thickness $t_2$ of the surface rubber layer was determined by measuring the distance from the surface of the fiber substrate to the surface of the rubber layer at ten sites, and calculating the number average value of the measurement results.

Appearance

The surfaces of the gloves produced in Examples and Comparative Examples were visually observed and evaluated according to the following criteria.

3: No cracks were observed.

2: A few cracks were observed.

1: A larger number of cracks were observed.

Flexibility

Each of the gloves produced in Examples and Comparative Examples was worn by ten people, and was evaluated according to the following evaluation criteria.

5: Soft

4: Moderate

3: Slightly Hard

2: Hard

1: Very hard

Wear Resistance

A wear test was conducted, and the evaluation was performed using Martindale abrasion tester (product name: "STM 633", available from SATPA Technology) according to a method described in EN 388. Specifically, each of the gloves produced in Examples and Comparative Examples was repeatedly rubbed while a predetermined weight was applied thereto. The number of times of rubbing before breakage of the glove was obtained. According to the number of times of rubbing before breakage of the glove, the gloves were classified into any one of LEVEL 0 to LEVEL 4. The higher the level, the better the wear resistance.

LEVEL 4: The number of rotations is 8,000 or more rotations.

LEVEL 3: The number of rotations is 2,000 or more and less than 8,000 rotations.

LEVEL 2: The number of rotations is 500 or more and less than 2,000 rotations.

LEVEL 1: The number of rotations is 100 or more and less than 500 rotations.

LEVEL 0: The number of rotations is less than 100 rotations.

Production Example 1

Production of Latex (A1) of Diene Rubber (A1)

Into a pressure resistant reactor with a stirrer, 30.0 parts of acrylonitrile, 5.5 parts of methacrylic acid, 0.5 parts of t-dodecylmercaptan as a molecular weight modifier, 150 parts of deionized water, 2.5 parts of sodium dodecylbenzene sulfonate, and 0.5 parts of the sodium salt of β-naphthalene sulfonic acid-formaldehyde condensate were placed. The air therein was replaced by nitrogen three times, and then 64.5 parts of 1,3-butadiene was added. Next, 0.3 parts of potassium persulfate and 0.05 parts of sodium ethylenediaminetetraacetate were added, and then the polymerization reaction was initiated while the internal temperature of the system was maintained at 30 to 40° C. The polymerization reaction was continued until the polymerization conversion ratio reached 97%. Thereafter, 0.1 parts of diethylhydroxylamine was added to stop the polymerization reaction. After unreacted monomers were removed from the resulting copolymer latex by evaporation under reduced pressure, the solids content and the pH of the latex were adjusted to provide a latex (A1) of a diene rubber (a1) having a solids content of 45 wt % and a pH of 8.5. The physical properties of the diene rubber (a1) in the resulting latex were measured according to the above methods. The diene rubber (a1) was found to be an acrylic rubber containing 64.5 wt % of 1,3-butadiene units, 30.0 wt % of acrylonitrile units, and 5.5 wt % of methacrylic acid units. The results are shown in Table 1.

Production Example 2

Production of Latex (A2) of Diene Rubber (a2)

A latex (A2) of a diene rubber (a2) having a solids content of 45 wt % and a pH of 8.5 was prepared in the same manner as in Production Example 1 except that the amount of 1,3-butadiene used was changed to 62.0 parts, the amount of acrylonitrile used was changed to 31.0 parts, the amount of methacrylic acid used was changed to 7.0 parts, and the amount of t-dodecylmercaptan used was changed to 0.7 parts. The physical properties of the diene rubber (a2) in the resulting latex were measured in the same manner as in Production Example 1 according to the above methods. The diene rubber (a2) was found to be an acrylic rubber containing 62.0 wt % of 1,3-butadiene units, 31.0 wt % of acrylonitrile units, and 7.0 wt % of methacrylic acid units. The results are shown in Table 1.

Production Example 3

Production of Latex (B1) of Diene Rubber (b1)

Into a pressure resistant reactor with a stirrer, 25.0 parts of acrylonitrile, 8.0 parts of methacrylic acid, 10.0 parts of t-dodecylmercaptan as a molecular weight modifier, 200 parts of deionized water, 3.0 parts of sodium dodecylbenzene sulfonate, 1 part of the sodium salt of β-naphthalene sulfonic acid-formaldehyde condensate, and 0.01 parts of sodium hyposulfite were placed, and the polymerization reactor was maintained at 10° C. Subsequently, a mixture of 6 parts of ion exchange water, 0.05 parts of sodium ethylenediaminetetraacetate, 0.005 parts of ferrous sulfate, and 0.05 parts of sodium formaldehyde sulfoxylate was placed into the polymerization reactor, the air therein was replaced by nitrogen three times, and then 67.0 parts of 1,3-butadiene was added. Next, 0.1 parts of diisopropylbenzene hydroperoxide was added, and the polymerization reaction was initiated while the internal temperature of the system was maintained at 10° C. Once the polymerization conversion ratio reached 90%, 0.1 parts of diethylhydroxylamine was added to stop the polymerization reaction. After unreacted monomers were removed from the resulting copolymer latex by evaporation under reduced pressure, the solids content and the pH of the latex were adjusted to provide a latex (B1) of a diene rubber (b1) having a solids content of 45 wt % and a pH of 8.5. The physical properties of the diene rubber (b1) in the resulting latex were measured according to the above methods. The diene rubber (b1) was found to be an acrylic rubber containing 67.0 wt % of 1,3-butadiene units, 25.0 wt % of acrylonitrile units, and 8.0 wt % of methacrylic acid units. The results are shown in Table 1.

Production Example 4

Production of Latex (B2) of Diene Rubber (b2)

A latex (B2) of a diene rubber (b2) having a solids content of 45 wt % and a pH of 8.5 was prepared in the same manner as in Production Example 3 except that the amount of 1,3-butadiene used was changed to 63.0 parts, the amount of methacrylic acid used was changed to 12.0 parts, and the amount of t-dodecylmercaptan used was changed to 12.0 parts. The physical properties of the diene rubber (b2) in the resulting latex were measured according to the above methods. The diene rubber (b2) was found to be an acrylic rubber containing 63.0 wt % of 1,3-butadiene units, 25.0 wt % of acrylonitrile units, and 12.0 wt % of methacrylic acid units. The results are shown in Table 1.

Production Example 5

Production of Latex (B3) of Diene Rubber (b3)

A latex (B3) of a diene rubber (b3) having a solids content of 45 wt % and a pH of 8.5 was prepared in the same manner as in Production Example 3 except that the amount of 1,3-butadiene used was changed to 69.0 parts, the amount of methacrylic acid used was changed to 6.0 parts, and the amount of t-dodecylmercaptan used was changed to 4.0 parts. The physical properties of the diene rubber (b3) in the resulting latex were measured according to the above methods. The diene rubber (b3) was found to be an acrylic rubber containing 69.0 wt % of 1,3-butadiene units, 25.0 wt % of acrylonitrile units, and 6.0 wt % of methacrylic acid units. The results are shown in Table 1.

Production Example 6

Production of Latex (B4) of Diene Rubber (b4)

A latex (B4) of a diene rubber (b4) having a solids content of 45 wt % and a pH of 8.5 was prepared in the same manner as in Production Example 3 except that the amount of t-dodecylmercaptan used was changed to 2.0 parts. The physical properties of the diene rubber (b4) in the resulting latex were measured according to the above methods. The diene rubber (b4) was found to be an acrylic rubber containing 67.0 wt % of 1,3-butadiene units, 25.0 wt % of acrylonitrile units, and 8.0 wt % of methacrylic acid units. The results are shown in Table 1.

Example 1

Preparation of Latex Composition

The latex (A1) and the latex (B1) was mixed such that the diene rubber (a1) and the diene rubber (b1) were present at a weight ratio [diene rubber (a1)/diene rubber (b1)] of 90/10, and the pH and the solids content of the mixture were adjusted to provide a latex composition having a solids content of 40 wt % and a pH of 8. For 100 parts of the sum of the diene rubber (a1) and the diene rubber (b1) in the resulting latex composition, aqueous dispersions of additives respectively containing 1.0 part of colloidal sulfur (available from Hosoi Chemical Industry Co., Ltd.), 0.5 parts of zinc dibutyldithiocarbamate (available from OUCHI SHINKO CHEMICAL INDUSTRIAL CO., LTD.), 1.5 parts of zinc oxide, and 3.0 parts of titanium dioxide were prepared (all the amounts are on a solids basis). The aqueous dispersions prepared were added to the latex composition. In the process of adding the aqueous dispersions of the additives, predetermined amounts thereof were slowly added while the latex composition was being stirred. After the additives were homogeneously mixed, carboxymethyl cellulose as a viscosity modifier was added to adjust the viscosity of the latex composition to 3000 mPa·s.

Preparation of Coagulant Solution

A coagulant solution was prepared by dissolving 1.0 wt % of calcium nitrate as a coagulant in methanol.

Production of Glove

First, the latex composition prepared above was aged (prevulcanized) at 30° C. for 48 hours. Next, a glove-shaped ceramic mold covered with a glove-shaped fiber substrate (material: nylon, average thickness d of substrate layer in fiber substrate: 720 µm, linear density: 300 denier) was immersed in the coagulant solution for 2 seconds. The mold was then pulled from the coagulant solution, and was dried at 30° C. for 1 minute. Subsequently, the glove-shaped ceramic mold was immersed in the latex composition for 2 seconds, and was then pulled from the latex composition. Thereafter, the mold was dried at 30° C. for 30 minutes, and then at 70° C. for 10 minutes, thereby forming a rubber layer on the fiber substrate. Next, the glove-shaped ceramic mold with the rubber layer formed thereon was immersed in warm water at 60° C. for 90 seconds to cause water-soluble impurities to elute from the rubber layer. Thereafter, the mold was dried at 30° C. for 10 minutes, and then was subjected to thermal treatment at 125° C. for 30 minutes to cross-link the acrylic rubbers in the rubber layer. The fiber substrate with the rubber layer formed thereon was peeled from the glove-shaped ceramic mold. Thus, a glove (laminate) was obtained. According to the above-described methods, the obtained glove (laminate) was examined to determine the thickness $t_1$ of the permeated rubber layer and the thickness $t_2$ of the surface rubber layer and evaluate the appearance, the flexibility, and the wear resistance. The results are shown in Table 1.

Example 2

A glove was obtained in the same manner as in Example 1 except that the latex (A1) and the latex (B1) were mixed such that the diene rubber (a1) and the diene rubber (b1) were present at a weight ratio [diene rubber (a1)/diene rubber (b1)] of 80/20. The glove was evaluated in the same manner as above. The results are shown in Table 1.

Example 3

A glove was obtained in the same manner as in Example 1 except that the latex (A1) and the latex (B1) were mixed such that the diene rubber (a1) and the diene rubber (b1) were present at a weight ratio [diene rubber (a1)/diene rubber (b1)] of 95/5. The glove was evaluated in the same manner as above. The results are shown in Table 1.

Example 4

A glove was obtained in the same manner as in Example 1 except that the latex (B2) was used instead of the latex (B1). The glove was evaluated in the same manner as above. The results are shown in Table 1.

Example 5

A glove was obtained in the same manner as in Example 1 except that the latex (B3) was used instead of the latex (B1). The glove was evaluated in the same manner as above. The results are shown in Table 1.

Example 6

A glove was obtained in the same manner as in Example 1 except that the latex (A2) was used instead of the latex (A1). The glove was evaluated in the same manner as above. The results are shown in Table 1.

Comparative Example 1

A glove was obtained in the same manner as in Example 1 except that a latex composition was prepared using only the latex (A1) without using the latex (B1). The glove was evaluated in the same manner as above. The results are shown in Table 1.

Comparative Example 2

A glove was obtained in the same manner as in Example 1 except that the latex (B4) was used instead of the latex (B1). The glove was evaluated in the same manner as above. The results are shown in Table 1.

TABLE 1

|  |  | Example 1 | Example 2 | Example 3 | Example 4 | Example 5 | Example 6 | Comparative Example 1 | Comparative Example 2 |
|---|---|---|---|---|---|---|---|---|---|
| | | | | Latex A Diene rubber (a) | | | | | |
| Composition | 1,3-Butadiene unit (wt %) | 64.5 | 64.5 | 64.5 | 64.5 | 64.5 | 62.0 | 64.5 | 64.5 |
| | Acrylonitrile unit (wt %) | 30.0 | 30.0 | 30.0 | 30.0 | 30.0 | 31.0 | 30.0 | 30.0 |
| | Methacrylic acid unit (wt %) | 5.5 | 5.5 | 5.5 | 5.5 | 5.5 | 7.0 | 5.5 | 5.5 |
| | Number of moles of carboxyl groups (ephr) | 0.064 | 0.064 | 0.064 | 0.064 | 0.064 | 0.081 | 0.064 | 0.064 |

TABLE 1-continued

| | | Example 1 | Example 2 | Example 3 | Example 4 | Example 5 | Example 6 | Comparative Example 1 | Comparative Example 2 |
|---|---|---|---|---|---|---|---|---|---|
| Molecular weight | Number average molecular weight (Mn) | 58,000 | 58,000 | 58,000 | 58,000 | 58,000 | 30,000 | 58,000 | 58,000 |
| | Weight average molecular weight (Mw) | 186,200 | 186,200 | 186,200 | 186,200 | 186,200 | 75,000 | 186,200 | 186,200 |
| | Molecular weight distribution (Mw/Mn) | 3.2 | 3.2 | 3.2 | 3.2 | 3.2 | 2.5 | 3.2 | 3.2 |
| | Volume average particle size (nm) | 110 | 110 | 110 | 110 | 110 | 120 | 110 | 110 |
| Latex (B) Diene rubber (b) | | | | | | | | | |
| Composition | 1,3-Butadiene unit (wt %) | 67.0 | 67.0 | 67.0 | 63.0 | 69.0 | 67.0 | | 67.0 |
| | Acrylonitrile unit (wt %) | 25.0 | 25.0 | 25.0 | 25.0 | 25.0 | 25.0 | | 25.0 |
| | Methacrylic acid unit (wt %) | 8.0 | 8.0 | 8.0 | 12.0 | 6.0 | 8.0 | | 8.0 |
| | Number of moles of carboxyl groups (ephr) | 0.093 | 0.093 | 0.093 | 0.139 | 0.070 | 0.093 | | 0.093 |
| Molecular weight | Number average molecular weight (Mn) | 4,300 | 4,300 | 4,300 | 3,000 | 23,000 | 4,300 | | 29,000 |
| | Weight average molecular weight (Mw) | 6,600 | 6,600 | 6,600 | 4,200 | 48,000 | 6,600 | | 71,000 |
| | Molecular weight distribution (Mw/Mn) | 1.5 | 1.5 | 1.5 | 1.4 | 2.1 | 1.5 | | 2.4 |
| | Volume average particle size (nm) | 90 | 90 | 90 | 88 | 100 | 90 | | 90 |
| Weight ratio between diene rubbers (a) and (b) in latex composition | | | | | | | | | |
| | Diene rubber (a) | 90 | 80 | 95 | 90 | 90 | 90 | 100 | 90 |
| | Diene rubber (b) | 10 | 20 | 5 | 10 | 10 | 10 | 0 | 10 |
| Laminate | | | | | | | | | |
| | Average thickness d (μm) of substrate layer | 720 | 720 | 720 | 720 | 720 | 720 | 720 | 720 |
| | Average thickness t (μm) of laminate | 930 | 935 | 925 | 930 | 915 | 910 | 920 | 920 |
| | Average thickness $t_1$ (μm) of permeated rubber layer | 240 | 240 | 240 | 238 | 242 | 235 | 240 | 245 |
| | Average thickness $t_2$ (μm) of surface rubber layer | 210 | 215 | 205 | 210 | 195 | 190 | 200 | 200 |
| Evaluations | | | | | | | | | |
| | Appearance | 3 | 3 | 2 | 3 | 2 | 2 | 1 | 1 |
| | Flexibility | 5 | 5 | 4 | 5 | 5 | 5 | 4 | 4 |
| | Wear resistance Number of ratations (rpm) | 13,000 | 7,000 | 15,000 | 8,000 | 10,000 | 12,000 | 16,000 | 14,000 |
| | LEVEL | 4 | 3 | 4 | 4 | 4 | 4 | 4 | 4 |

Laminates having few or no cracks on their surface and having excellent flexibility and wear resistance could be obtained using the latex compositions containing the latex (A) of the diene rubber (a) having a weight average molecular weight of 50,000 or more and 1,000,000 or less and containing ethylenically unsaturated acid monomer units and the latex (B) of the diene rubber (b) having a weight average molecular weight of 500 or more and less than 50,000 and containing ethylenically unsaturated acid monomer units (Examples 1 to 6).

In contrast, the laminate obtained using the latex composition containing only the latex (A) of the diene rubber (a) having a weight average molecular weight of 50,000 or more and 1,000,000 or less and containing ethylenically unsaturated acid monomer units had a large number of cracks on its surface (Comparative Example 1).

The laminate obtained using the latex composition containing the latex (B) of the diene rubber (b) having a weight average molecular weight of 50,000 or more and containing ethylenically unsaturated acid monomer units had a large number of cracks on its surface (Comparative Example 2).

The invention claimed is:

1. A latex composition comprising:
   a latex (A) of a diene rubber (a) having a weight average molecular weight of 50,000 or more and 1,000,000 or less and containing an ethylenically unsaturated acid monomer unit; and
   a latex (B) of a diene rubber (b) having a weight average molecular weight of 500 or more and less than 50,000 and containing an ethylenically unsaturated acid monomer unit.

2. The latex composition according to claim 1,
   wherein the diene rubber (a) and the diene rubber (b) are present at a weight ratio [diene rubber (a)/diene rubber (b)] of 99/1 to 70/30.

3. The latex composition according to claim 1,
   wherein the ethylenically unsaturated acid monomer unit contained in the diene rubber (a) is a carboxyl group-containing ethylenically unsaturated monomer unit, and
   the ethylenically unsaturated acid monomer unit contained in the diene rubber (b) is a carboxyl group-containing ethylenically unsaturated monomer unit.

4. The latex composition according to claim 1,
   wherein the ethylenically unsaturated acid monomer unit contained in the diene rubber (b) is a carboxyl group-containing ethylenically unsaturated monomer unit, and
   the number of moles of carboxyl groups is 0.01 to 0.35 ephr per 100 g of the diene rubber (b).

5. The latex composition according to claim 1,
   wherein the diene rubber (a) is a nitrile rubber further containing an α,β-ethylenically unsaturated nitrile monomer unit.

6. The latex composition according to claim 1,
   wherein the diene rubber (b) is a nitrile rubber further containing an α,β-ethylenically unsaturated nitrile monomer unit.

7. The latex composition according to claim 1,
   wherein the latex composition is used to form a rubber layer on a fiber substrate.

8. A laminate comprising a fiber substrate and a rubber layer laminated thereon,
the fiber substrate comprising a plurality of fibers,
the rubber layer being formed from the latex composition according to claim 1.

* * * * *